Feb. 24, 1925.
C. G. BROSTROM ET AL
1,527,391
FOLDING MACHINE
Filed May 12, 1917
5 Sheets-Sheet 4

Inventors
C. G. Brostrom
Andrew R. Ridderstrom
by Clyde L. Rogers
their Atty.

Patented Feb. 24, 1925.

1,527,391

UNITED STATES PATENT OFFICE.

CHARLES G. BROSTROM, OF LYNN, AND ANDREW R. RIDDERSTROM, OF NAHANT, MASSACHUSETTS, ASSIGNORS, BY DIRECT AND MESNE ASSIGNMENTS, TO BEACON FOLDING MACHINE COMPANY, OF LYNN, MASSACHUSETTS, A CORPORATION OF MASSACHUSETTS.

FOLDING MACHINE.

Application filed May 12, 1917. Serial No. 168,165.

*To all whom it may concern:*

Be it known that we, CHARLES G. BROSTROM and ANDREW R. RIDDERSTROM, citizens of the United States, and residents, respectively, of Lynn, in the county of Essex and Commonwealth of Massachusetts, and of Nahant, in the county of Essex and Commonwealth of Massachusetts, have invented an Improvement in Folding Machines, of which the following description, in connection with the accompanying drawings, is a specification, like characters on the drawings representing like parts in each of the several views.

The present invention relates to methods of and machines for folding flexible material, and is hereinafter described, and is illustrated in the accompanying drawings, in connection with a machine for folding or turning over the margins or edges of boot and shoe uppers, such as vamps, tips and the like. The invention is not, however, restricted to machines of this character, but has also other and more general fields of usefulness. Machines for folding binding strips around the edges of shoe uppers to which they are sewed, machines for turning the channel flaps of channeled shoe soles, and other machines for folding flexible material are all included within the present invention. In order to avoid circumlocution of language, all such machines will hereinafter be included in the specification and, more particularly, in the claims, under the generic term, "folding machine;" and it will be understood that the term "margin" or the term "edge" will be employed herein to denote not only the border portions of a shoe upper, but also a marginal binding strip, the channel flap of a channeled sole, and other such parts that are intended to be folded in the defined "folding machine."

According to present-day practice in shoe manufacture, after the margin of a boot or shoe upper has been cemented, the upper is introduced into the machine, in which it is advanced, step by step, past a knife and a folder or plow, to a fold presser, or hammer. The knife is controlled to snip the margin, when desired, the plow acts to initiate the fold, and the fold thus initiated is pressed down by the fold presser, being held in pressed condition by the cement.

A very important object of the present invention is to improve upon present-day methods and machines, to the end that a better and a better-controlled initial fold or turn may be produced.

With this end in view, a feature of the invention contemplates moving the plow backward in the line of feed, while the stock is held stationary, causing it to ride along the edge of the stock to impart the desired, initial fold in the margin. This movement of the plow may, in practice, be effected by mounting the plow upon one of the feed elements, as the lower feed block. At the end of the backward feed movement, the feed means, the plow and the stock advance to present the fold thus initially prepared by the plow to the fold presser. The stock may be held stationary in any desired manner during the folding operation of the plow. According to the illustrated embodiment of the invention, the stock is held stationary, during the return movement of the plow, by the fold presser itself, which is held down to grip the work during the pauses in the feed.

The foregoing and other objects and advantages of the invention will more fully appear from the following detailed description, and the distinctive features of novelty will be pointed out in the appended claims.

Referring to the drawings.

The frame or housing of the machine comprises a body portion 10, extending up into a curved overhanging portion 11, with a forwardly extending nose 12. The nose 12 is spaced from the body of the frame above an extension 13, the extension 13 constituting what is known as the "horn" of the machine. The frame is equipped with a bearing 14 to receive the rear portion of a drive shaft 15, in substantially the plane of the feed elements, referred to below. The forward end of this shaft is journaled in a separate bearing bracket or sleeve 16, which may be rigidly secured to the frame by a cross pin or rod 17. For adjustably centering the bearing sleeve 16, transverse screws 115 are fitted from opposite sides, through web portions of the machine housing, to engage the sleeve at opposite points.

A hand-and-balance wheel 18 is keyed or otherwise suitably secured upon the outer end of the shaft 15, and is provided with a clutch face 19. The clutch face 19 is adapted to be frictionally engaged by a cooperative clutch face on the inner side of a driving pulley 20 that is fitted on a sleeve 21. The clutch face of the pulley 20 is normally held away from the clutch face 19 by a coil spring 22 that is housed in a recess between the wheel 18 and the pulley 20. The sleeve 21, which is slidably fitted loosely on the shaft 15, has a head 9. The pulley 20 is maintained in engagement with the head 9 by the spring 22. A head 23 is fitted in the outer end of the sleeve 21 and is engageable by a wear button 24, that is constituted of fibre or the like, and that is carried at the upper, outer end of a lever arm 25. The lever arm 25 is pivoted to the frame at 26 and is rigidly provided with a long, horizontally extending arm 27. The arm 27 reaches most of the way toward the front of the housing, where its extremity is slotted to receive therein, with a capability of endwise sliding, a pivot block 28. The pivot block 28 is carried at one end of a short lever, link bar 29, the other end of which is pivoted at 30 to the end of one arm 31 of a bell crank lever. The bell-crank lever is fulcrumed at 45 and its other arm 32 has an adjustable stop pin 33 fitted in its extremity adapted to engage the frame as an abutment to limit the swinging movement of the said lever in one direction. The swinging of the said lever in the other direction is yieldingly limited by an adjustable headed bolt 34 threaded into the frame and having a coil spring 35 interposed between its head and a seat in the lever arm 32. The lever bar 29 is pivotally connected at an intermediate point 36 with a depending bracket 37, the pivot connection 36 being, as shown, nearer to the pivot block 28 than to the pivot 30, for a reason that will later appear. The bracket 36 has a shoulder 38 formed thereon underneath the pivot 36 and is equipped with a depending pin 39 slidably fitted through a bearing strut 40 of the frame. A compression coil spring 41 is interposed between this strut and the shoulder 38. Upon release of the treadle, the coil spring 41 will return the lever arms 27 and 31 to their illustrated, ineffective positions, permitting the spring 22 to disconnect the clutch faces and also elevating the feed point, as will later appear. The bracket 37 is provided with an offset portion having a pivot connection 42 with a depending rod 43. The rod 43 is adapted to be connected with a treadle (not shown), and typifies any suitable control, preferably manual, for the power clutch and also for the upper feed point.

For applying a brake to the machine by the same operating device that controls the power clutch, a short, brake lever arm 104 is mounted on the pivot 26. The arm 104 is provided with a brake shoe 105 that is adapted to engage the periphery of the wheel 18. The arm 104 has a downward extension 106 below its pivot 26, where it is engaged by a screw 107 that is adjustably carried in a lug 108, rigid with and depending from the arm 25. Thus, upon an upward movement of the arm 27, to disengage the driving-clutch elements, the pin 107, by engaging the extension 106, applies the brake at a time predetermined by the adjustment of the screw 107.

The lower end of a vertically disposed link bar 46 is pivoted to the lever arm 31 at 44, relatively close to the fulcrum 45. The upper end of the link bar 46 is pivoted at 47 to the inner end of a frame plate 48. The frame plate 48 is pivoted to swing in a vertical plane about a pivot pin 49 that is transversely fixed in the frame of the machine, and is provided with a vertically disposed pivot post 50. The base of a bracket mounting 51 is pivoted to swing or rock horizontally about the post 50 as an axis, on a bearing surface provided at the top of the plate 48. A lower feed block 53 is clamped, as shown at 52, to the forward end of the bracket mounting 51, and is provided with a plow 116 for turning up the margin of the stock, as will be more fully explained later. The bracket mounting 51 has spaced-apart, rearward, wing extensions or ears 54, bearing a transverse pivot pin 55 that constitutes a pivot or axis for a lever arm 56. The lever arm 56 is thus adapted to swing vertically on an intermediately disposed pivot pin 55 that is transversely secured between the extensions or ears 54, and also with the mounting 51, to swing or rock horizontally about the vertical pivot pin 50. A leaf spring, in the form of a resilient plate 58, is clamped to the lever arm 56, at its inner end, and relatively remote from the pivot 55, as seen at 57. The leaf spring 58 extends forward well beyond the pivot 55, to constitute a resilient yielding mounting for the upper feed member 59 which, as shown, is integral with the said spring plate. This upper feed member comprises a downwardly and inwardly turned extremity, terminating in a downwardly projecting feed point 60, opposite the lower feed block 53. By means of this construction, the use of separate, spring-controlled cams is rendered unnecessary, so that the feed elements may be positively connected to their operating instrumentalities. The inner end of the lever arm 56 is formed with a socket 61, in which is fitted a ball head, mounted on a crank pin 62, which is carried at the end of the drive shaft 15.

As the shaft 15 is rotated, the lower feed block 53 is oscillated by the crank pin 62 in a horizontal plane about the axis 50. The upper feed member 59 also partakes of this horizontal oscillation and is at the same time endowed with a vertical oscillation about the horizontal axis 55. It is in consequence of the horizontal oscillations that the feed members are caused to produce the feed movement, and the vertical oscillation causes the feed point to grip and release the work alternately. The path that the feed point 60 follows is curved, generally oval, in nature. The feed point presses the material against the lower block 53 whenever the treadle rod 43 is depressed. Depression of the treadle rod effects a downward movement of the link bar 46 and a corresponding swinging movement of the plate 48 about the pivot pin 49. This movement of the plate 48 results in a relative movement towards each other of the feed block and the feed point, both of which it supports. The more that the treadle rod is depressed, the closer will the feed point and the feed block be caused to approach each other; with the result, as the feed point is carried by the spring plate 58, and yields upward by spring action, that the oval path of the feed point will become more and more flattened. The flatter the oval path of the feed points, the sooner will the material be engaged between the feed point and the feed block on each feeding movement, and the longer will each such engagement take place. The arm 56, carrying the feed point, of course, moves through the same range, with the feed block, during every intermittent feed movement; but the feed point is caused to engage the material earlier and earlier, before the completion of its downward movement, the farther and farther that the treadle rod is depressed. According to the degree of depression of the treadle, therefore, the feed point may be caused to engage the material to feed it through longer or shorter feed strokes, as desired.

The mounting 51 is equipped with an adjustable stop screw 63, adapted to determine the final limit of downward movement of the feed point 60, and the frame is equipped with spaced stops 64, 65 for co-operation with the bell-crank lever arms 31 and 32. The stops 64 and 65 limit the described operative movement of the treadle in opposite directions, thereby determining the final limits of feeding movement of the upper and lower feeding elements.

For performing the snipping operation in concave margins of the stock, a movable knife 66 is provided for co-operation with a fixed knife block 67 mounted on the horn portion of the frame. The knives are held against movement in the line of feed. The knife 66 is clamped for limited vertical adjustment by means of an elongated slot and clamp screw, as indicated at 68, at the end of the outer arm of a lever 69. The lever 69 is pivoted at 70 and is provided with an inwardly extending, bent arm the extremity of which is pivotally connected at 71 to one end of a pitman rod 72. The other end of the pitman rod 72 is connected to a crank pin 73 that is carried by a spiral gear 74 journaled on a pivot 75 carried by the frame. The spiral gear 74 is in driven engagement with a co-operative spiral gear 76 that is fixed on the drive shaft 15. It will be noted that the spiral gear 76 is only one-half the diameter of the spiral 74, the purpose of this being to obtain a reduction in the driven ratio from the shaft 15 to the snipping knife, since, on account of the relatively short feed strokes of the present machine, as described, it is not necessary that a snipping cut be made at every feed stroke but, in practice, it is found that such a snip cut at every other feed stroke is amply sufficient. The pivotal point 70 of the lever 69 is adjustable. For this purpose, the pivot pin is carried at the end of a swinging arm 77 fulcrumed to a pivot pin of the frame at 78. Also engaged with the pivot pin 70 is a link bar 79, the other end of which is pivoted at 80 to the short arm of a bell crank lever 81 which is pivoted to the frame at 82 and has its longer horizontally extending arm pivotally connected at 83 to a downwardly extending treadle rod 84 which may have associated therewith a suitable treadle, or like manual operating device (not shown). It will be noted that the mounting arm 77 extends from its pivot generally transverse of the direction of the knife carrying lever 69 and thus a swinging adjustment of said arm as effected by the treadle of the rod 84, will shift the knife 66 transversely with reference to the line of feed of the stock as produced by the feeding point 60 and feed block 53, thus causing the knife 66 to snip in to a greater or less depth according to the swinging adjustment of said arm mounting 77. The arm 77 has formed therewith opposite transversely extending lugs 85, 86, the former engageable by an adjustable set screw 87 fitted into the frame housing and the latter engageable with a stop screw 88 adapted to be set in fixed adjustment. The adjustable stop screw 87 is at the forward side of the arm 77 and thus its adjustment will determine the extent to which the knife 66 may be set outward,—i. e., to determine the maximum depth of the snip cut, while the setting of the stop 88 will determine the possible inward movement of the knife upon retraction thereof. For normally holding the knife 66 at its outer limit of movement a suitable coil spring 89 is provided to react against a lug 90 of the frame housing, and press upward against a collar 91 adjustably fixed on the treadle rod 84.

Figure 1:
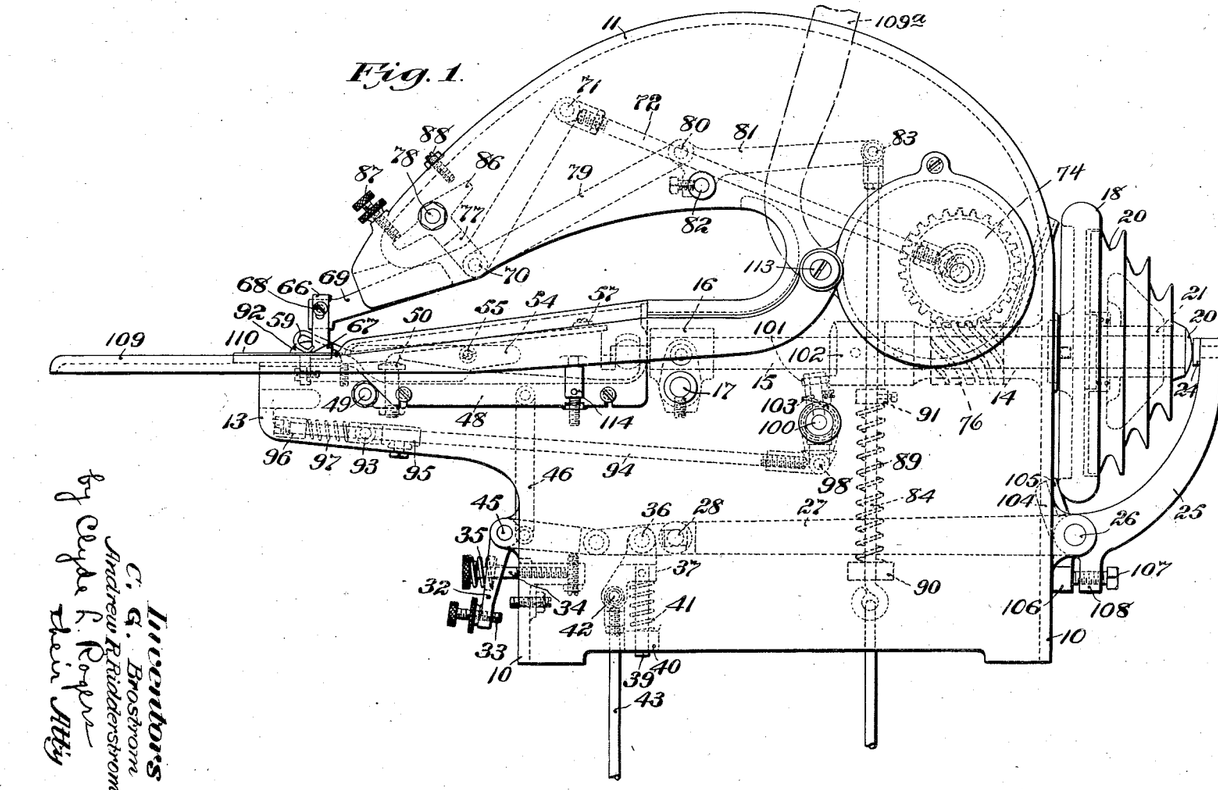
Fig. 1 is a side elevation of a machine constructed in accordance with our invention.
Figures 2, 3:
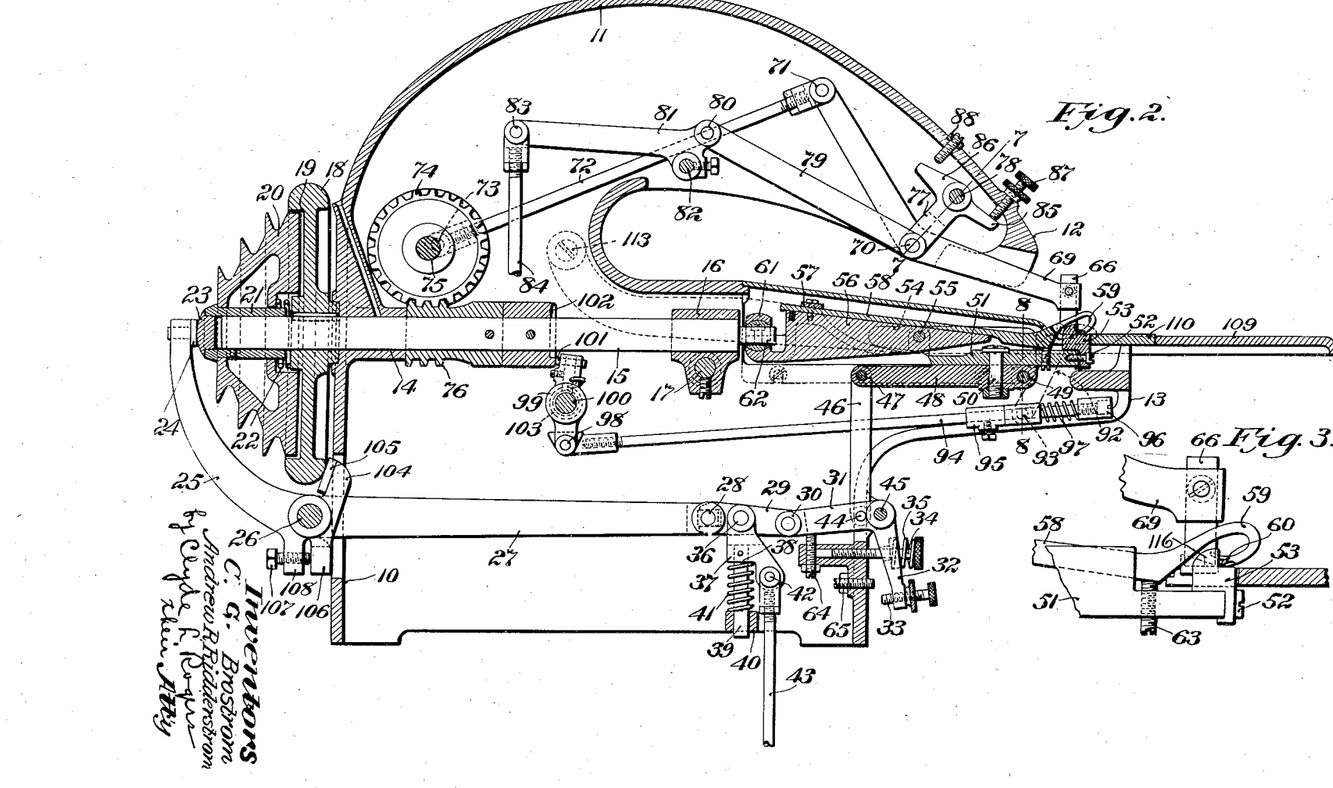
Fig. 2 is a central lengthwise vertical section thereof.
Fig. 3 is a fragmentary detail illustrating the immediate working parts in side elevation.
Figure 4:
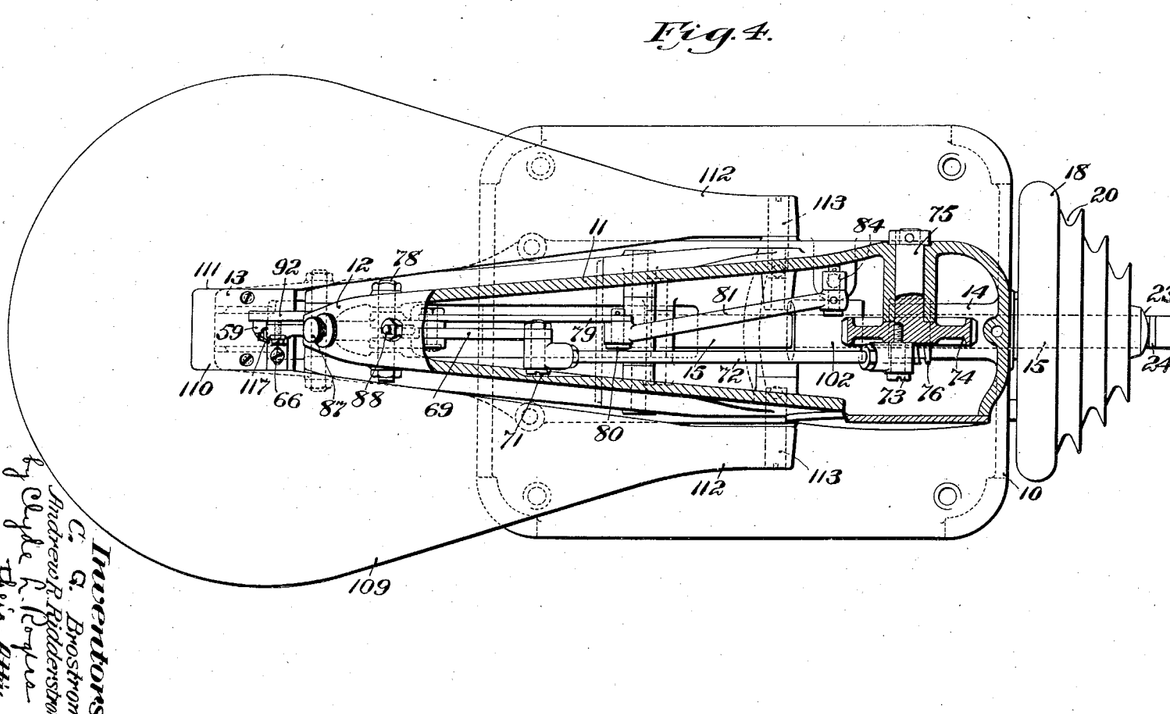
Fig. 4 is a plan view of the machine, with the top of the frame, and certain operative parts broken away in horizontal section to show better the interior construction.
Figure 5:
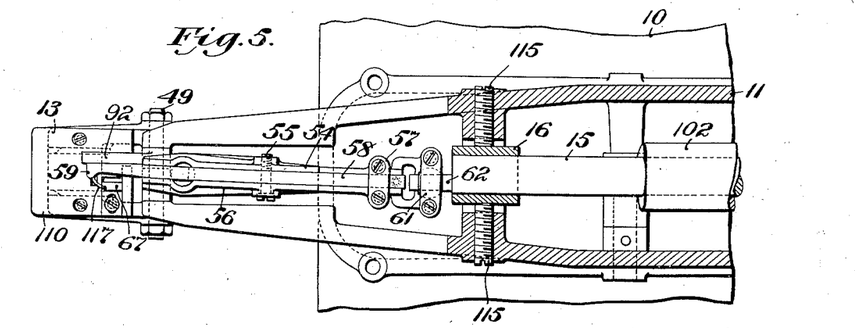
Fig. 5 is a partial view of the front of the machine with certain parts removed and others in section, to illustrate the immediate working elements.

For completing the folding over of the margin of the vamp, after it is turned up by the plow on the lower feed block, as more fully explained later, and for hammering or pressing down the same, a hammer 92 is provided which, as shown more particularly in Fig. 2, is pivoted to the same pivot pin 49 that serves as a pivot for the mounting 48. The hammer 92 is held from movement in the line of feed and is normally inclined, extending obliquely upward and outward. Its lower end is pivotally connected to a collar 93 that is slidably carried on an operating rod 94. The collar 93 is held for limited movement between a stop collar 95 on the rod 94 and a stop head 96 carried at the end of the said rod, and is normally held yieldingly against the collar 95 by a coil spring 97 that is interposed between the collar 93 and the head 96. The inner end of the rod 94 is pivotally connected at 98 to the lower end of a short lever 99. The lever 99 is fulcrumed to the frame at 100 and its upper end is provided with a contact piece 101 that is engageable with a cam face 102 fixed on the shaft 15. A coil spring 103 is anchored to the pivot 100 and engages the upper portion of the lever 99, thus pressing the said upper end of the said lever constantly against the cam 102. The hammer 92 is therefore oscillated in timed relation to the feed movements. The hammer blows are rendered yielding or resilient to the required extent by reason of the interposed spring 97, while the upward movement of the hammer is rendered positive by engagement of the fixed collar 95 with the slide collar 93.

In machines of this kind it is desirable to be able to move the table out of the way when operating upon certain kinds of work, such as so-called "cylindrical" vamps. Heretofore it has been customary to remove the table altogether. But to dismount the table from the machine requires some little time and involves liability of losing the securing parts during assembling and disassembling. According to the present invention, the table is pivoted to the machine frame or housing at a point relatively far back, and remote from the horn, so that it may be swung up and backward over the horn and housing, and out of the way of the operator, without taking the same off from the machine. The table is indicated at 109, and is shown fitted around the platform 110 at the front of the horn, this platform being a relatively small plate block adjustably clamped to the top of the horn, and the table 109 being recessed, as seen at 111, to fit down over the same. The table has projections 112 at each side of the machine housing, extending to a point well rearward thereof, where their extremities are fulcrumed, as seen at 113, to transverse pivots carried by the housing. The forward portion of the table is adjustably supported by prop posts 114 that are vertically threaded into the frame housing at each side thereof, the adjustment of these prop posts permitting the table to be adjustably set so that its top surface will be approximately flush with the surface of the platform 110.

Figures 6, 7, 8:
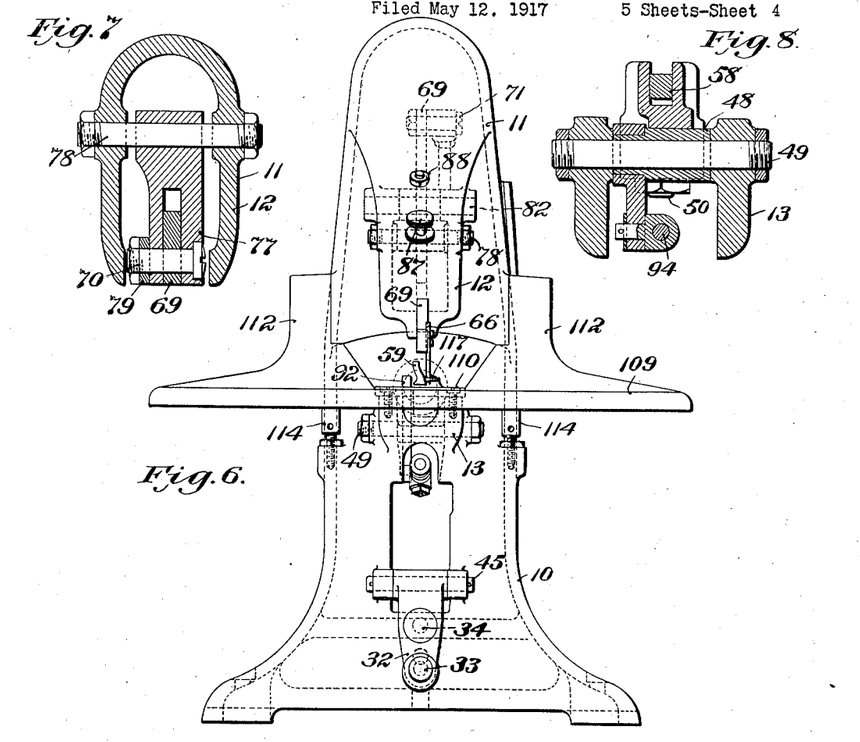
Fig. 6 is a front view of the machine.
Fig. 7 is a sectional detail on line 7—7 of Fig. 2.
Fig. 8 is a sectional detail on line 8—8 of Fig. 2.
Figures 9, 10, 11:
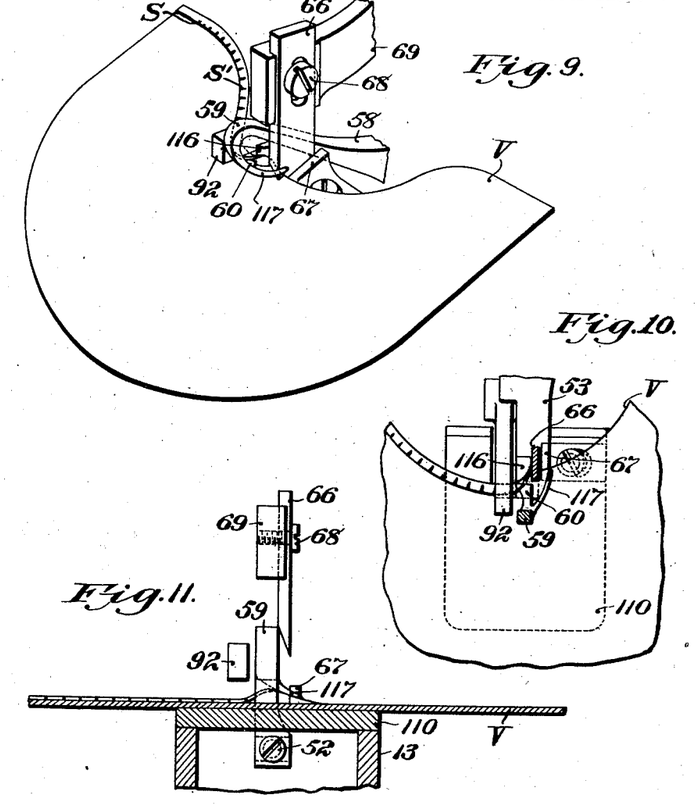
Fig. 9 is a fragmentary perspective showing a vamp and the immediate working parts in operative relation thereto.
Fig. 10 is a fragmentary detail in sectional plan also showing the immediate working parts in operative relation to a vamp.
Fig. 11 is a detail in vertical section showing the working parts in action on a vamp with a portion of the frame in vertical section.
Figure 12:
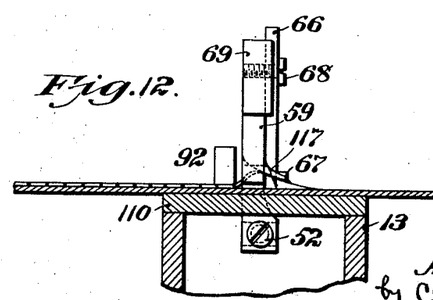
Fig. 12 is a detail similar to Fig. 11 showing another position of the operative parts.

Referring now more particularly to the immediate working parts, as hitherto explained, the stock is gripped for feeding between the lower feed block 53 and the upper feed point 60. On the lower feed block 53 is carried the "plow" or folder 116, presenting a curving face of changing outline, as shown more particularly in Fig. 6, adapted to catch the horizontally extending edge of the vamp V and turn the same up to an approximately vertical position. The feed point and the feed block 53 are adapted to engage the material at a point such that the line joining this point to the plow 116 is substantially at right angles to the line of feed. The plow and the feed elements are therefore as effective, both to fold and to feed, at sharply curved portions of the margin, as at straight portions. If the plow were at a substantial distance forward of the feed elements, for example, a sharply convex portion of the stock would be moved by the feed elements out of range of the plow, so as not to be folded at all thereby, and a sharply concave portion would be folded too far over by the plow. The hammer 92 is formed with a horizontal extremity for engaging that portion of the work that is located just beyond the feed members, along the line of feed. The operating mechanism is timed so that the hammer shall move down to grip the turned-over margin of the stock, as seen in Fig. 12, during the time that the feed members are moving backward, preliminarily to getting a new grip on the stock. In the said Fig. 12, the feed members are illustrated in the positions that they occupy just prior to their return movement. During this return movement, the plow 116, which moves with the feed block 53, performs the described operation of turning up the margin of the vamp. The upper feed point 60 is, as shown, provided with a forwardly projecting finger 117 that is adapted to extend over and engage and guide the margin of the stock, just in advance of the plow, so as to hold it against the plow and keep it from buckling up prematurely, prior to the action thereon of the plow. The snipping knife 66 is arranged just in advance of the plow 116, along the line of feed, as shown in Figs. 9, 10 and 11 and, as before explained, the operating device of this knife is preferably timed to cause it to operate once at every other feed movement; though it will be understood that this is merely illustrative, and that any desired ratio between the feed movements and the snipping operations may be obtained by selective changes in the spiral-gear drive for the snipping knife. Since the hammer 92 is mounted to extend obliquely upward and forward, its action on the edge of the stock will be in the same oblique direction, thus insuring the proper turning down of the margin of the vamp that has already been turned upward by the plow 116.

In use, the operator, introducing the vamp V into the machine, places the margin thereof on the lower feed block 53. At this time, when the machine is idle, the feed block is relatively depressed under the action of the spring 41, and the upper feed point 60 is correspondingly lifted, so that ample room is afforded for inserting the work. Upon depression of the treadle rod 43, the lever link 29, first swinging on the point 30 as a fulcrum, since the pivot 36 is nearer to the point 28, operates the lever 25, to throw in the clutch elements 19, 20, starting the machine. The feed members thereupon begin their cycle of movements, but still separated and ineffective. When the operator wishes to begin work, he now further depresses the treadle rod 43. This causes the link 29 to swing on the point 28 as a fulcrum, since this point can move no further, and the link 29 swings downward the lever 31, thus effecting a turning movement of the mounting 48 about the pivot 49 to elevate the feed block 53 into its effective plane. At the same time, the pivot 55 of the arm 56 is moved downward, causing this arm to swing downward about the bearing 61 as a fulcrum. The feed member 59 is thus actuated, with a multiplied movement, into effective position. If the operator desires a relatively slow feed, he depresses the treadle rod 43 to a relatively lesser extent, which causes the feed point 60 of the feed member 59 to engage the material through a small portion only of its lower range of movement. The feed point is in this manner caused to describe a relatively wide or broad oval path, so that the material is only moved forward a little at each step. If, however, a more rapid feed is desired, the treadle rod is depressed further, causing the arm 56 to become tilted further, and this will result in the spring-plate mounting 58 of the upper feed point becoming placed under spring tension. The feed point 60 will therefore engage the material sooner, and remain in engagement with it longer to effect a longer range of feed. At this time, the spring plate 58 yields resiliently to permit the arm 56 to continue operating in an oval path, though the feed point 60 is constrained to move, during this feed movement, in a straight path,—with the result that the feed point describes approximately a more or less flattened oval. The feed may thus be varied, at will, by depressing the treadle rod 43 to a greater or less extent, as desired by the operator.

The invention may be embodied in other specific forms as to its various details, and certain of the features of novelty described may be advantageously used apart from others of the present combination, and it is therefore desired that the present embodiment be considered in all respects as illustrative, and not restrictive, reference being had to the appended claims, rather than to the foregoing description, to indicate the scope of the invention.

Having described our invention, what we claim as new and desire to secure by Letters Patent is:

1. The method of folding material that comprises feeding the material step by step, initiating folds in the material during pauses in the feed, maintaining the material against movement in the line of feed during the said pauses in the feed, and pressing the folds during pauses in the feed subsequent to the pauses during which the said folds were initiated.

2. The method of folding material that comprises feeding the material step by step, engaging the material with a member and moving the member backward in the line of feed during pauses in the feed, while maintaining the member in engagement with the material, to initiate folds in the material, and maintaining the material against movement in the line of feed during the said pauses in the feed.

3. The method of folding material that comprises feeding the material step by step, engaging the material at a predetermined position in the line of feed and folding the material from the said position backward in the line of feed during pauses in the feed to initiate folds in the material, pressing the folds during pauses in the feed subsequent to the pauses during which the said folds were initiated, and maintaining the material against movement in the line of feed during the said pauses in the feed.

4. A folding machine having, in combination, means for feeding material step by step, a plow for initiating folds in the material during pauses in the feed while the material is maintained against movement in the line of feed, and means for pressing the folds during pauses in the feed subsequent to the pauses during which the said folds were initiated.

5. A folding machine having, in combination, means for feeding material step by step, a plow for initiating folds in the material during pauses in the feed while the material is maintained against movement in the line of feed, a fold presser held from movement in the line of feed, and means for actuating the fold presser to press the folds during pauses in the feed subsequent to the pauses during which the said folds were initiated.

6. A folding machine comprising feeding mechanism composed of co-operative material holding members extending and operating substantially in the plane of material feed equipped with means for vibrating the same, one of said members bearing means for initiating a fold in the material, and a member connected for movement in timed relation to said feeding mechanism adapted to press down and clamp the material to hold it from movement on the return stroke of the feeding mechanism.

7. A folding machine comprising feeding mechanism composed of a lower feed block and an upper feed point co-operative therewith and extending substantially in the plane of material feed, means for vibrating said feeding mechanism, a movable plow for initiating a fold in the stock carried by said feed block and a vibrating hammer held from movement in the line of feed for pressing down the folded-over material connected for movement in timed relation with said feeding mechanism.

8. A folding machine comprising feeding mechanism composed of co-operative material-holding members equipped with means for vibrating the same extending substantially in the plane of materi 1 feed, one of said members bearing means for initiating a fold in the material.

9. A folding machine comprising feeding mechanism composed of a lower feed block and an upper feed point connected for vibration together in the feeding plane, and also for relative movement toward and from each other to grip the material, said feed block bearing a plow adapted to initiate a fold in the material c a the return stroke of the feeding mechanism, and a hammer associated with said feeding mechanism and connected for vibrating movement whereby it presses down the fold in the material and clamps the same to hold it stationary as said feeding mechanism makes its return movement.

10. A folding machine having, in combination, means for feeding material step by step, a plow movable backward in the line of feed during pauses in the feed while the material is maintained against movement in the line of feed to initiate folds in the material during the said pauses in the feed, and means for pressing the said folds.

11. A folding machine having, in combination, means for feeding material, a plow movable backward in the line of feed for initiating folds in the material, a fold presser held from movement in the line of feed for pressing the folds initiated by the plow, and means for actuating the feed means, the plow and the fold presser.

12. A folding machine having, in combination, two cooperating feed members for feeding material, means for moving the feed members back and forth to feed the material step by step, one of the feed members having a plow for initiating a fold in the material during the return movement of the feed members, and a fold presser for pressing the fold initiated by the plow.

13. A folding machine having, in combination, means for feeding material, means for moving the feed means back and forth to feed the material step by step, means movable with the feed means for initiating a fold in the material during the return movement of the feed means, and means for holding the material against movement during the return movement of the feed means.

14. A machine of the class described having, in combination, a support for a piece of flexible material, a feed member, a folder, and means fo. moving the feed member and the folder backward along the edge of the material and in contact therewith to form the fold.

15. A machine of the class described having, in combination, a support for a piece of flexible material, a feed member, a folder, means for moving the feed member and the folder backward along the edge of the material and in contact therewith to form the fold, and means for pressing the fold.

16. A machine of the class described having, in combination, a support for a piece of flexible material, pressing means held from movement in the line of feed, a feed member, a folder, and means for moving the feed member and the folder backward along the edge of the material and in contact therewith to form a fold, and for moving the feed member and the folder forward to present the fold to the pressing means.

17. A machine of the class described having, in combination, a support for a piece of flexible material, a member movable back and forth in the direction of the feed, a feed member and a folder both carried by the movable member, a second feed member, means for moving one of the feed members towards the other feed member intermittently, and means for reciprocating the feed members and the folder.

18. A machine of the class described having, in combination, a support for a piece of flexible material, a member movable backwardly and forwardly in the direction of the feed, an upper feed member and a folder both carried by said movable member, a lower feed member, means for raising and lowering said lower feed member intermittently, means for causing said lower feed member to reciprocate with said upper feed member and said folder, and pressing means located in advance of the folder.

19. A machine of the class described having, in combination, a support for a piece of flexible material, a movable member, means for moving the movable member in the line of feed, a folder and feeding means carried by the movable member, and fold-pressing means adapted to hold the material stationary during the backward movement of the movable member.

20. A machine of the class described having, in combination, a support for a piece of flexible material, a hammer and an anvil held from movement in the line of feed, means for feeding the material intermittently past said hammer and said anvil, a plow movable back and forth in the line of feed, and means for varying the extent of the intermittent feed movements during the operation of the machine.

21. A machine of the class described having, in combination, a support for a piece of flexible material, a folder, means for moving the folder along the edge of the material to form a fold in the margin thereof, means held from movement in the line of feed for slitting the margin, and means for pressing the fold.

22. A machine of the class described having, in combination, a support for a piece of flexible material, a hammer held from movement in the line of feed, means for feeding the material intermittently past the hammer, a plow movable backward and forward along the edge of the material with the feeding means in the line of feed, and means for reciprocating the hammer, said means being timed to cause the hammer to hold the material stationary during the backward movement of the plow and feeding means and to release the material during forward movement of the feeding means.

23. A machine of the class described having, in combination, a support for a piece of flexible material, pressing means held from movement in the line of feed, a folder, means for moving the folder backward along the edge of the material to form a fold, and means for moving the folder and the material forward to present the fold to the pressing means.

24. A machine of the class described having, in combination, a support for a piece of flexible material, means for feeding the material intermittently over the support, a folder, and means for moving the folder backwardly along the edge of the material to form the fold during the pauses in the feed.

25. A machine of the class described having, in combination, a support for a piece of flexible material, means for feeding the material intermittently over the support, a folder, means for moving the folder backwardly along the edge of the material to form the fold during the pauses in the feed, and means for pressing the fold thus produced.

26. A machine of the class described having, in combination, a support for a piece of flexible material, a folder, means for moving the folder along the edge of the material to form the fold, means for thereafter moving the folder and the material in the opposite direction, and means for holding the material stationary during the first movement of the folder and for releasing it during the second movement.

27. A machine of the class described having, in combination, a support for a piece of flexible material, means for feeding the material intermittently over the support, means for pressing the fold, a folder, and means for moving the folder backwardly along the edge of the material to form the fold while the pressing means is holding the material stationary.

28. A machine of the class described having, in combination, a support for a piece of material, a pair of feed members, means for imparting to said members a backward and forward movement in the line of feed, means for causing relative approaching and receding movements of said members to grip and release said material, a folder for engaging the edge of the material, said folder moving in unison with said members in their backward and forward movement to form the fold, and means for holding the material stationary during the formation of the fold.

29. A machine of the class described having, in combination, a support for a piece of material, a pair of feed members, means for imparting to said members a backward and forward movement in the line of feed, means for causing relative approaching and receding movements of said members to grip and release said material, a folder for engaging the edge of the material, said folder moving in unison with said members in their backward and forward movement to form the fold, and means held from movement in the line of feed for pressing the fold.

30. A machine of the class described having, in combination, a support for a piece of material, a pair of feed members, means for imparting to said members a backward and forward movement in the line of feed, means for causing relative approaching and receding movements of said members to grip and release said material, a folder for initiating a fold in the margin of the material, said folder moving in unison with said members in their backward and forward movement, and means for pressing the fold, said pressing means serving to hold the material stationary during the movement of the folder along the edge thereof.

31. A machine of the class described having, in combination, a support for a piece of flexible material, a member movable backward and forward in the line of feed, a feed member and a folder both carried by said movable member, a fold presser held from movement in the line of feed, and means for reciprocating said fold presser.

32. A machine of the class described having, in combination, a support for a piece of flexible material, a fold presser held from movement in the line of feed, a folder movable along the edge of the material to form the fold, a slitting knife, and means for operating the presser, the folder and the knife.

33. A machine of the class described having, in combination, a support for a piece of flexible material, a movable member, a folder fast to the movable member, a feed member pivoted to the movable member, means for raising and lowering the feed member, a second feed member arranged to cooperate with the first-named feed member mounted on the movable member, means for moving the movable member, a fold presser, and means for operating the fold presser.

34. A folding machine having, in combination, means for feeding sheet material, a plow for initiating a fold in the material, means for actuating the plow and the feed means as a unit, and means for varying the feed while continuing to actuate the plow.

35. A folding machine having, in combination, means for folding the margin of a sheet of material, and means separated from the folding means by a constant distance for feeding the material to the folding means, the feed means having a finger adapted to extend over the said margin to hold the said margin from folding prior to the action of the folding means on the margin.

36. A folding machine having, in combination, a support over which material is fed step by step, a plow for initiating a fold in the material, a fold presser for pressing the fold initiated by the plow, a driving shaft for actuating the plow back and forth in the line of feed, and means whereby the material is fed one step only corresponding to each revolution of the shaft.

37. A folding machine having, in combination, means for feeding sheet material, a folder for folding the material, means for actuating the folder back and forth in the line of feed, and means for varying the feed while continuing to actuate the folder.

38. A folding machine having, in combination, means for feeding material, a plow for initiating a fold in the material, a fold presser for pressing the fold initiated by the plow, means for operating the feeding means and the plow, and a positive connection between the feeding means and plow and the operating means.

39. A folding machine having, in combination, means for feeding and folding material comprising a feed point, a feed block and a plow, means for operating the feeding and folding means, and a positive connection between the feeding and folding means and the operating means.

40. A folding machine having, in combination, two feed members, means for moving the members backward and forward in the line of feed and for causing relative approaching movements of the members during the forward movement and relative receding movements during the backward movement to cause the members to engage material intermittently and to feed the material step by step, a plow movable backward and forward with the members and adapted to initiate a fold in the material during the backward movement, the plow and the point of engagement of the members with the material being situated along a line that is substantially at right angles to the line of feed, and means for pressing the fold initiated by the plow.

41. A machine of the class described having, in combination, a support for a piece of flexible material, a hammer and an anvil held from movement in the line of feed, means for feeding the material intermittently past said hammer and anvil, a plow movable back and forth in the line of feed, and means for varying the extent of the intermittent feed strokes during the operation of the machine, the construction and arrangement being such that the forward limit of the intermittent movements of the feeding means and plow is always the same.

42. A machine of the class described having, in combination, a support for a piece of flexible material, a hammer held from movement in the line of feed, means for feeding the material intermittently past the hammer, a plow movable backward and forward along the edge of the material with the feeding means in the line of feed, and means for reciprocating the hammer.

43. A machine of the class described having, in combination, a support for a piece of flexible material, pressing means held from movement in the line of feed, a folder for forming a fold in the edge of the material, and means for moving the folder and the material forward to present the fold to the pressing means.

44. A machine of the class described having, in combination, a support for a piece of flexible material, a folder, means for moving the folder along the edge of the material to form a fold, said means thereafter moving the folder in the opposite direction, and means for holding the material stationary during one of said movements of the folder and for releasing it during the other movement.

45. A machine of the class described having, in combination, a support for a piece of flexible material, means for feeding the material intermittently over the support, a folder, means for moving the folder backwardly along the edge of the material, and means for holding the material stationary during the backward movement of the folder.

46. A machine of the class described having, in combination, a support for a piece of material, a pair of feed members, means for causing relative approaching and receding movements of said members to grip and release said material, a folder for engaging the edge of the material, the said folder moving in unison with said members in their backward and forward movement to form the fold, and means for holding the material stationary during the backward movement of the folder.

47. A machine of the class described having, in combination, means for feeding material, a plow for initiating a fold in the material, means for operating the feeding means and the plow, and a positive connection between the feeding means and the plow and the operating means.

48. A folding machine having, in combination, fold-pressing means, means for intermittently feeding material thereto comprising a vibratory feed block and a cooperating vibratory feed point, a folder mounted upon one of the feed elements, means for vibrating the feeding means at relatively high speed, and a positive connection between the feeding means and the vibrating means.

In testimony whereof, we have signed our names to this specification.

CHARLES BROSTROM.
ANDREW R. RIDDERSTROM.